May 15, 1956 J. R. OISHEI 2,745,130
WINDSHIELD CLEANER
Filed May 19, 1951 2 Sheets-Sheet 1
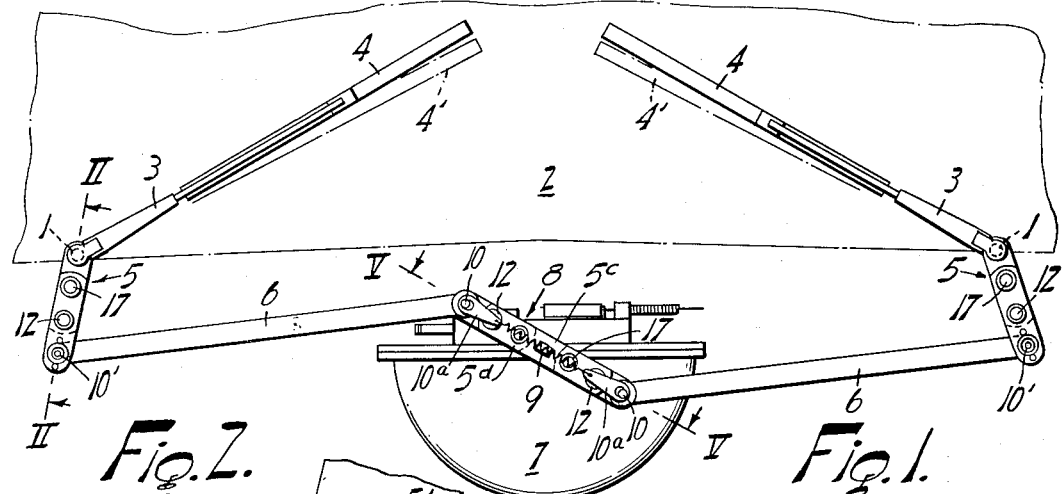
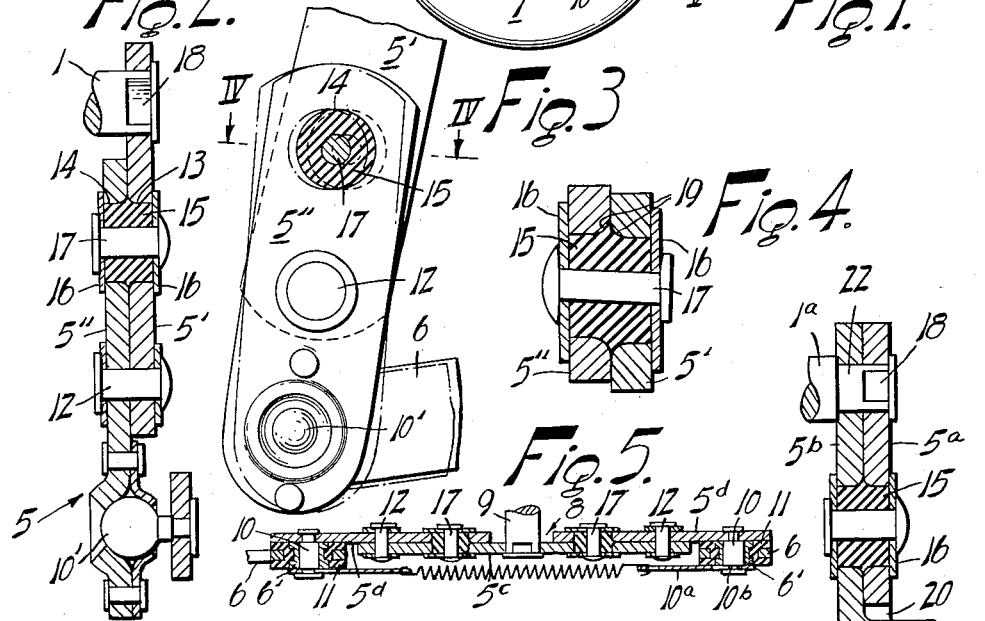
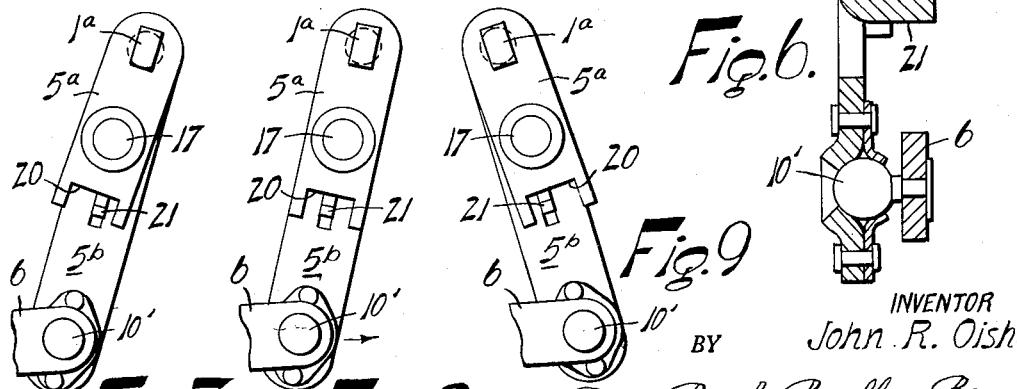
INVENTOR
BY John R. Oishei
Bean, Brooks, Buckley & Bean
ATTORNEYS

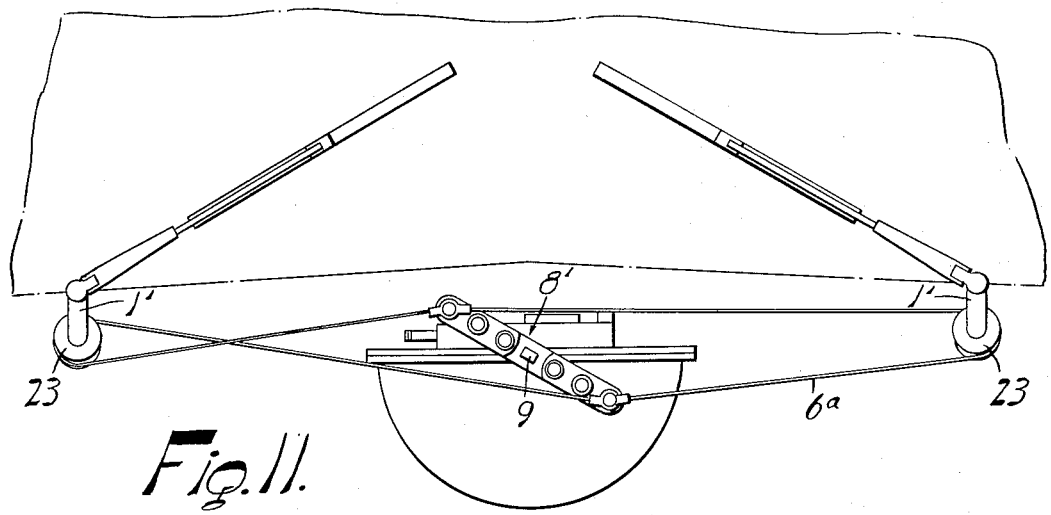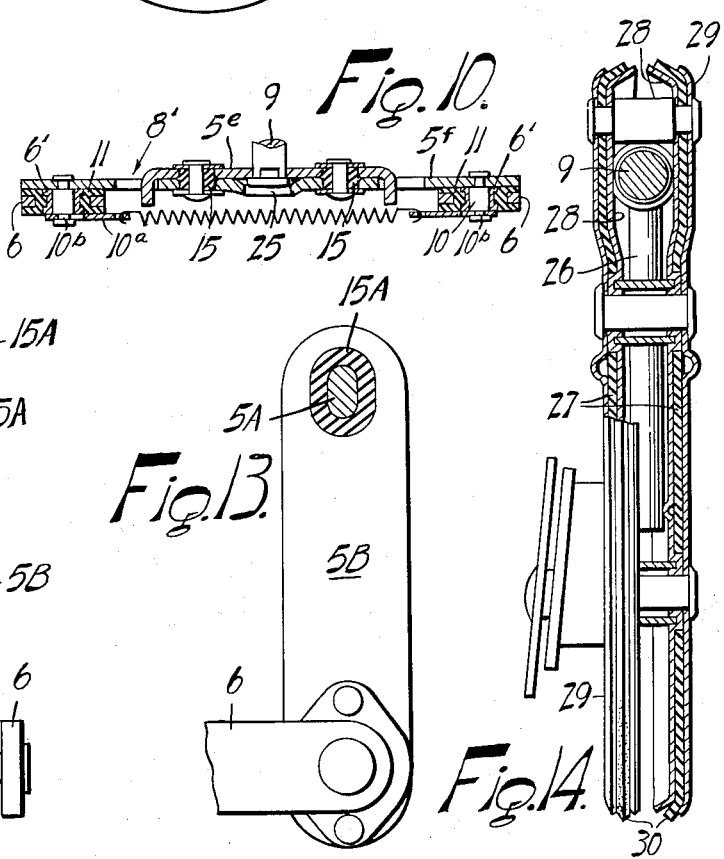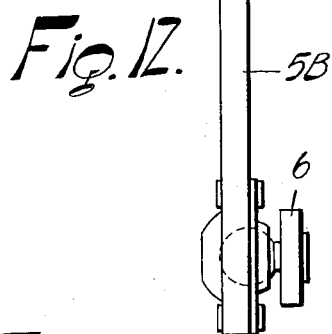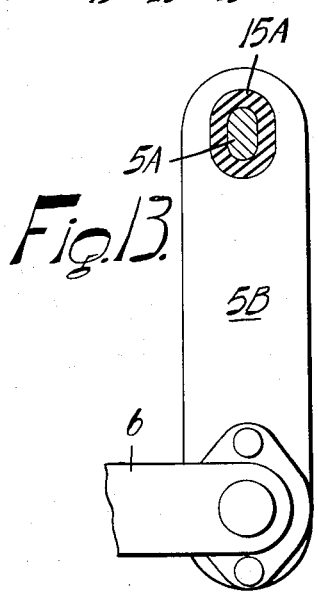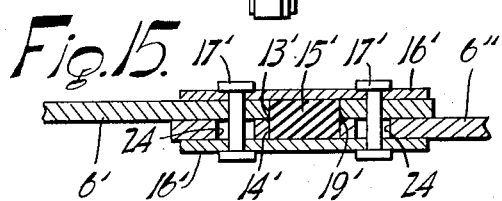

United States Patent Office 2,745,130
Patented May 15, 1956

2,745,130

WINDSHIELD CLEANER

John R. Oishei, Buffalo, N. Y., assignor to Trico Products Corporation, Buffalo, N. Y.

Application May 19, 1951, Serial No. 227,190

13 Claims. (Cl. 15—253)

This invention relates to the windshield cleaning art, and it has for its primary object to provide a more efficient windshield cleaner having a smoother and quieter wiping action with less wear and tear on the mechanism.

Heretofore in the wiping of windshields, smaller blades and lighter arms were used than at present. Originally the automatic cleaner comprised a suction motor having its shaft directly carrying a lightly constructed arm and wiping blade. The blade consisted of a single strip of very light rubber held in a channel, and the arm was in the form of a length of wire of less than .01 inch diameter. The purpose first of all was to make the arm and blade as inconspicuous as possible and to lighten the load on the small motor carrying the single wiper unit.

As the automobile design was streamlined, the trend moved in the direction of larger windshields, slanting rearwardly and upwardly and from which evolved the present-day curved glass structure. With this change, heavier arms and blades or wipers were required to clean the larger areas with increased pressure in the wiping contact. Heavier rubber was substituted, until the combined arm and wiper assemblage had a weight and bulk many times that of the light single strip blade and wire arm first used. In the course of this development, two wipers were introduced in place of one, requiring a more powerful motor and a transmission mechanism in which greater weight had to be moved back and forth.

In the process of moving the weight of two heavier arms and blades back and forth and oscillating the wiper rapidly, as fast as three strokes a second, the momentum of the oscillating parts developed an inertia force at the end of the wiping stroke which heretofore has been met with a rigid inflexible construction, the result being that a collision took place between the force of the swinging wiper and arm members, on the one hand, and the torque pull of a reversed motor in an opposite direction, on the other. The impact of the rigid connecting means was destructive of the wear life of the parts and constituted a source of a pounding noise at each reversal of direction of oscillation. This repeated hammering would take place 80 to 90 times per minute or more and obviously grew noisier as wear developed.

In the present invention the objective is to deal with the problem of wear and noise of impact by overcoming or arresting the force of inertia by permitting this force to spend itself in a relatively gradual arrest of the wiper at the time when the motive power is reversely applied, thereby to reduce the clash and abruptness in the directional change for the protection of the mechanism and the elimination of the cause of the impact noise.

This is accomplished in the illustrated embodiments by confining a resilient driving link within a closed orifice or chamber to serve as a yieldable transmission member between cooperating levering elements for regulating their response to the opposing forces, the control of the response being determined by the confinement of the resilient body within the closed chamber. The chamber is constructed of two circular openings in the two levers, the openings being normally in registry with each other and of a sufficient depth to retain a solid section of the resilient body, so that when the force of the inertia is acting on one lever, and the reversed driving torque of the motor is applied to the other lever, the interposed connecting resilient body will be transversely deformed. As one lever moves to the right and the other lever moves to the left, the opposite edge wall portions of the openings move toward each other against the resilient link, acting to restrict their movements and causing the link to rapidly deform in shape by distorting the resilient material through a pincers action. Immediately upon the checking of the inertia force, the resilient link resumes its original contour by expending its energy in restoring the parts to their normal relation so that the wiper and arm will move throughout the following stroke in their geometrically and factory-prescribed order. The action provides a means of arresting the inertia force while normally maintaining the transmission parts in their operating alinement or relation for substantially the entire wiper stroke. The inertia arresting function develops a rapidly compounding resistance to the free terminal wiper movement which builds up a potential third force to expedite such alinement restoration.

It is a further object of the invention to provide a windshield cleaner with an oscillatory wiper-arm unit which is permitted an independent movement wherein the inertia force is dissipated, and in the meantime the power unit, independently thereof, is permitted to reverse and start its next stroke into which latter movement the momentarily displaced unit is restored substantially in an instantaneous manner to assure the prescribed unified wiper shaft and motor shaft movement.

A further object is to provide a windshield cleaning system wherein the force of inertia in the wiper is restrained against unfavorable reaction upon the suction operated motor whereby the latter is protected from unnecessary wear.

The foregoing and other objects will manifest themselves as this description progresses, references being made therein to the accompanying drawings, wherein Fig. 1 is a diagrammatic view showing a windshield cleaner embodying the present invention;

Fig. 2 is a sectional view taken about on line II—II of Fig. 1;

Fig. 3 is an enlarged fragmentary view of one of the rocker arms showing more clearly the operation of the inertia arrester;

Fig. 4 is a cross sectional view of line IV—IV of Fig. 3;

Fig. 5 is a longitudinal sectional view through the double throw arm about on line V—V of Fig. 1;

Fig. 6 is a view, similar to Fig. 2, of a modified rocker arm;

Figs. 7, 8 and 9 are diagrammatic lay-out views depicting a modified composite rocker arm in its different phases of operation;

Fig. 10 is a view similar to Fig. 5 through a modified double-throw crank arm;

Fig. 11 shows a windshield cleaner of the cable transmission type and embodying the present invention;

Figs. 12 and 13 are fragmentary views in side and front elevation respectively of a further modified embodiment;

Fig. 14 is a view, partly in section, of the motor piston; and

Fig. 15 is a sectional view through a modified link bar.

Referring more particularly to the drawings, the numerals 1 designate the dual rock shafts which are journaled at the lower side of the windshield 2 and carry at their outer ends the actuating spring arms 3 for the wipers or blades 4. Each wiper actuating shaft has a fixed depending rocker arm 5 connected by a link bar 6 to a source of power, such as the suction operated motor 7, which has a double-throw rocker arm 8 fixed to its shaft 9. The inner ends of the link bars are connected to the crank pins 10 on the opposite ends of the double-throw motor-driven rocker arm 8, the link bars being provided with oilless bronze bearings 6' mounted in yieldable self-conforming sockets in the form of rubber grommets 11 to facilitate the engagement should there be slight misalinement in the installation. The grommets also avoid metal-to-metal contact as the link bars reciprocate. A spring retainer 10a is engaged in grooves 10b in the outer ends of the crank pins to secure the link bars thereon. The outer ends of the bars are pivotally joined to the rocker arms 5 in a permanent manner, as indicated at 10'. When installing the windshield cleaner, the three shafts are placed and then the inner ends of the link bars are engaged with crank pins, such engagement being facilitated by the grommets for easy self-adjusting alinement and installation advantages.

This arrangement is generally well known, the operation being that as the motor reciprocates the link bars 6, an oscillatory motion will be imparted to the rock shafts 1 to move the wipers and their carrying arms back and forth across the glass. At the moment of reversal, the inertia in each moving wiper will carry it beyond the prescribed limits of the motor-powered strokes, but in the meantime, the motor will reverse itself and drive the link bars 6 in the opposite direction. The result is a clash of the two components, namely, the force of inertia and the reversed torque of the motor, with the wiper being too abruptly reversed by the motor, thereby imposing a strain upon the mechanism and developing a thumping operational noise which is amplified by the car body to the annoyance of the motorist. Accompanying this would be a violent rebound in the flat spring shank of the wiper arm as the inertia in the load would twist or spring the shank.

Attempts have been made to stop the "telegraphing" of the impact noise, as by mounting the motor on rubber. However, in practice this provision has not proved satisfactory because the cause of impact was still present. The two opposing forces, colliding in the direct line of power transmission, continued to be present, one component acting to drive the connected part in one direction and the other force concurrently acting in direct opposition through a travel-limited, rigid, and inflexible construction. Enlarging the grommet would tend toward flabbiness and wobble and thereby introduce a lost motion in anchorage and an upsetting in the alinement of parts to put the mechanism beyond satisfactory control over the degree of travel of the wiper when in operation.

In accordance with the present invention, the cause of the noise of impact has been removed, and the heretofore objectionable force of inertia is put to advantage in that it is utilized to store up energy for the realinement of parts previously referred to. The moving force of inertia in the wiper is permitted to spend itself after the motor has reversed, while the motor is enabled to start its return stroke in an independent manner for a very brief interval as determined by the reestablishment of the normal relationship between the parts of the transmission.

At normal speeds of windshield cleaner operation the objectionable inertia force is absent, the fit of the parts in the arrester device providing resistance to misalinement and being sufficient to assure normal wiper movement in a fixed geometrical oscillation with respect to the drive shaft to cause the wiper to travel over a prescribed area of the windshield. At higher speeds wherein the objectionable terminal force manifests itself, the arrester functions to smooth out the wiper operation and to quiet its action. To this end, there is incorporated in the power transmission a resilient device that acts in the capacity of a double-acting auxiliary-motion member to provide for a limited independency of action between the wiper and the motor. Preferably, this device is arranged in either the drive arm 8 or in the driven rocker arm 5, or both, and as illustrated it embodies a self-restoring break joint construction comprising arm sections 5' and 5'', Fig. 2, joined by a pivot pin 12 for relative hinging movement. The arm sections overlap each other at their inner ends with a sliding facial contact and their face portions are formed with normally registering orifices or recesses 13 and 14 in which is engaged a resilient member 15 whose functions are to maintain the arm sections normally alined and to yield in absorbing the energy incidental to wiper reversal by permitting the moving force of inertia in the wiper to spend itself while independently permitting the development of the reversing torque in the motor to pick up the wiper when freed from such inertia force.

The resilient member illustrated comprises preferably an oil resistant rubber body, such as a synthetic rubber, having a conformable fit in the registering orifices 13, 14, where it is confined by closure plate 16 that are tied together by a rivet 17. The body when tubular will readily enable placement of the rivet therein. This construction in effect provides opposed cupped seats or recesses that define a body-receiving chamber for completely inclosing the body and preferably without clearance to controllably maintain the definite relation between the parts of the transmission.

This composite rocker arm, with its incorporated resilient energy-storing capacity, is fixed to the adjacent rock shaft 1 by a swaging step, after first fitting the apertured outer end of the section 5' on the flat face 18 of the shaft, while the opposite end of the arm is connected to the link bar 6 by a pivot connection 10'. Being so mounted, the upper section 5' will be rigid with its rock shaft and therefore the four parts 1, 3, 4 and 5' will oscillate in unison and may be considered as the wiper-arm unit. The lower section 5'' is directly responsive to the motor torque. Therefore, the inertia-controlled wiper-arm unit, by reason of the energy-storing embodiment, is given a movement individual to itself and independent of the motor imparted movement.

Considering, for example, the left wiper in Fig. 1, when the inertia-imparted overtravel of the wiper-arm unit occurs, as indicated at 4', the resilient energy-storing joint in the driven rocker arm will function against the increasing resistance of the resilient link. This terminal movement at high speed, amounting to possibly five degrees or more, reflects in a like angular displacement of the upper arm section 5', as suggested by the solid lines in Fig. 3, to carry the pivot 12 to the left, during which operation the faces of the two arm sections slide one upon the other and the opposed edge portions of the orifices will act upon the resilient body 15 pincer-like to deform it in cross section. This loads the resilient body and arrests the free inertia-energized travel of the unit, and during this arresting action the motor reverses its driving torque to pull the lower arm section 5'' to the right, as suggested by the dot and dash lines in Fig. 3, for acceleration following the arrest. This pull to the right is assisted by the resilient link. The adjacent edges of the orifices are rounded to provide a cam face 19 tending to depress the rubber link and produce a retarding friction.

When subjected to a deforming pressure, the movement of the rubber body over the wall surface of the chamber 13, 14 will be retarded by reason of the frictional resistance offered by the wall contact. When the pressure has been released, the displaced rubber of the resilient link will return to normal under the retarding friction between the contacting surfaces. Furthermore, there is an internal friction set up in the rubber body when displaced and as the rubber moves away from the area of greater compression toward the area of lesser pressure. The friction thus developed by the rubber displacing action assists in arresting the overtravel of the unit. Likewise, the friction set up during this arrest remains effective during the realinement of the arm sections to avoid objectionable rebound in the resilient link.

The inertia-arresting action is facilitated through the leverage provided in the pivotally connected arm sections, the section 5″ constituting a lever that fulcrums on the rivet 12 while the section 5′ constitutes a lever arm to rock with the rock shaft. Through these cooperating parts the interposed rubber body will be subjected to a severe deforming pressure by reason of the fact that the end closures 16 effect a complete enclosure for the body.

Should the deforming pressure become destructive of the rivet 17, or through a faulty structure should the rivet otherwise fail, and thereby render the resilient driving link 15 useless, there is provided a normally inoperative mechanical interlock between the two arm sections to insure a continuance of the windshield operation for the emergency. This safety factor may take the form of a lug on one arm section normally playing in a slot or cut-out in the companion section but capable of establishing a positive driving connection between them when called upon. Such a safety factor may be provided in the arm sections 5′, 5″ but for the sake of clarity it has been rather depicted in the modification of Fig. 6 wherein the lever arm 5a has a slot 20 in its free end to receive the lug 21 struck out of the companion arm section 5b, sufficient clearance being provided to permit the normal functioning of the resilient body 15 as previously set forth. In ths modified structure the pivotal or fulcrum axis has been raised above the resilient link 15 and even placed coaxial with the rock shaft 1a, the latter having a chordal flat 18 to fix the lever 5a thereon and a reduced bearing 22 on which the arm section 5b may pivot. Relative angular movement between the two levers will be yieldably resisted by the resilient link 15, as in the first described embodiment.

In both forms of the invention, the motive power is applied to the outer arm section 5′ (5a) and transmitted to the driven rock shaft through the full length composite rocker arm while the inertia-imparted wiper movement reacts on the inner arm section 5″ (5b) through a different leverage with a shorter work arm, relative to the full length rocker arm. The motor torque is applied to the outer end of the rocker arm to move the wiper; whereas the inertia effected overtravel reacts through a relatively short work arm (5′, 5a). Therefore, the shorter arm section 5′ or 5a, during this reaction will enable the wiper-arm unit to travel through a greater arc for a given body-deforming movement of the shorter work arm. This independent movement of the wiper-arm unit involving its shorter arm has the effect of retarding the arrest of the wiper unit to avoid a thumping noise at the time of wiper reversal when the reversed motor torque is being applied to the outer end of the rocker arm.

Figs. 7, 8 and 9 illustrate the relationship of the levers through a wiper stroke counterclockwise. In Fig. 7 the force of inertia in the previous stroke of the wiper-arm unit has about spent and the link bar 6 has started its new stroke to the right to angularly displace the arm sections. Immediately thereafter the inertia-arresting resilient link expands its stored-up energy to realine the arm sections, as in Fig. 8, and this relation is maintained throughout the wiper stroke. Again, at the end of this stroke, the inertia force is spending or has spent and the link bar restarts to the left so that the arm sections assume the angular displacement substantially as depicted in Fig. 9.

The rubber body, while yieldably absorbing the two compressive forces, is deformed to provide a source of potential energy in strength sufficient to realine the arm sections immediately upon the dissipation of the inertia force and to maintain such alinement throughout the wiping operation. By maintaining this alinement of the arm sections, the full length of the composite rocker arm as well as the normal relation between the arm and the parts of the transmission are preserved to properly place the wiper on the windshield in accordance with the factory specification. As soon as the overtravel is arrested, the arm sections are normalized or realined for driving the wiper through its prescribed arc. It is therefore important that the arm sections be realined promptly following any relative angular displacement, and accordingly the rubber body is given a tensional strength and resiliency so to function. In the present embodiments, the rubber body is confined within its chamber under pressure. This controls the inertia arresting action and maintains alinement of the sections to avoid a lag in position of the wiper which latter should at all times bear a definite relation to the driving rocker arm for the greatest efficiency. The geometry or relation is fixed at the factory and must be maintained to assure the normal travel of the wiper over its predetermined path on the windshield. The resilient link is given a resiliency proportionate to the weight of the wiper-arm unit. This can be secured in a practical manner by bringing the end closures 16 down upon the opposite ends of the rubber body, of a predetermined oversize, to compress the body into a snug fit in its chamber. This will place the confined resilient body under a pre-tensioned state commensurate with the weight and inertia of the unit to give a quick response to any deformative squeeze by the arm sections.

Further control of the resilient link action may be regulated by changing the leverage afforded by the pivotally connected arm sections, as for example, by changing the spacing between the pivot 12 and the resilient link 15, or by changing their lengths.

The rubber body constitutes a double action spring between the two arm sections. Metal springs may be used but these are subject to a recoil action which is lacking in rubber. The friction present in the use of rubber also serves to retard and arrest the wiper-arm unit, and the load imposed upon the rubber link creates therein the desired restoring force for realining the arm sections.

In the embodiment disclosed in Figs. 12 and 13, the rockshaft 1A has its fixedly related arm section 5A formed integrally with it and the lever 5B pivotally hung thereabout. The resilient link 15A is likewise tubular and fitted over the lever forming shaft end 5A. This resilient link is confined under the compressive force of side plates 16A. Relative turning movement between the arm sections will displace the rubber link from the area of greatest pressure at the forward side of the section 5A around to the rear in yieldably resisting the movement of the wiper-arm unit.

The inertia absorbing construction of the driven arm may be incorporated in the driving crank arm, and where the latter is of the dual type, as depicted in Fig. 5, the two inner arm sections may comprise a single cross plate 5c having a medially located hole receiving the peened-over end of the motor shaft 9. In this disclosure, the inner arm sections constitute the driving cross plate 5c while the outer sections 5d are pivoted thereto and constitute the driven ones which are responsive directly to the inertia force of the respective link bars forming parts of the wiper-arm units. As shown, the resilient links 15 are located between the source of power and the pivotal joints between the sections or levers, so that this force of inertia will act upon the resilient link through a lever of the first order. This further affords a leverage different from that in the driven rocker arm and provides a cooperative relationship between the two leverages for gaining the desired advantages.

The dual driving arm of composite construction may be used in combination with the two driven arms of composite formation, as shown in Fig. 1, or it may be employed solely, as indicated at 8′, Fig. 11, wherein a power transmitting cable 6a passes about pulleys 23 that are fixed to the wiper actuating rockshafts 1′. For ease of description, the connecting cable portions are construed as flexible link bars and the pulleys as rocker arms by which the rockshafts are oscillated.

Fig. 10 discloses a modified embodiment of the dual type driver arm, wherein the driving cross plate 5e is fixed to the power shaft 9 and the heretofore individual outer arm sections are united in a single cross plate 5f to which the link bars are joined. The two cross plates 5e and 5f are connected by two resilient links 15, one on each side of the shaft axis and each capable of serving as a pivotal support for the other. The cross plate 5f may have an opening 25 therein to give access to the shaft end for the peening step. The cross plate may be disposed on the opposite side of the fixed cross plate 5e and journaled on the shaft, as exemplified in Fig. 6, or it may be loosely passed over the shaft to expose the shaft end for the peening operation.

In all of the disclosed forms of the physical embodiments of the inventive concept, the spring or resilient link is of sufficient strength to maintain the parts normally related for a predetermined wiper operation, of say 30 or 40 strokes a minute, and is confined within a closed chamber to rapidly build up to an arresting counterforce to match its strength to the weight or mass of the wiper-arm unit and the inertia force developed thereby above the predetermined speed. By reason of this confinement the desired yieldability is obtained for the overtravel of the heavy unit and the required restorative capacity is available to maintain the parts of the mechanism in their intended relation. The wiper and its carrying arm are free to move as a unit in response to the inertia, and without a violent clashing with the reversed driving torque of the motor, the resilient link being deformed by the slower moving shorter arm section. The safety stop-lug 21 may also be designed to engage the end walls of the cut-out 20 to provide a positive and non-yielding connection between the arm sections for overcoming unusual resistance to wiper movement, such as might be encountered by a wet snow-pack on the windshield.

The inertia absorbing device has a beneficial reaction on the suction operated motor which latter has a vane-like piston comprising spaced sections loosely straddling the motor shaft 9 and a shaft-carried pin 26, for self-adjustment within the motor chamber to avoid possible binding due to some inaccuracy, as is more fully set forth in copending application Serial Number 106,356, now Patent No. 2,612,874, October 7, 1952. Each piston section is composed of a rubber sheet 27 clamped between inner and outer body plates 28 and 29 to support the rubber packing flange 30. The rubber packing flange is oil resistant and is designed to have a light uniform contact with the chamber wall under the fluid pressure differential and without the use of an expander. Since the piston is self-adjusting and floating within the motor chamber, it is desirous to avoid the transmission of excessive jars back to it through the power transmission which might otherwise have a detrimental effect on the piston. The presence of the inertia arrester or absorber precludes such jar transmission by eliminating the cause of the jar, and therefore the power unit of the windshield cleaning system is preserved to insure utmost efficiency.

In Fig. 15, a construction is shown wherein the pretensioned resilient link 15' is incorporated in the reciprocatory link bar, the latter having overlapping sections 6' and 6" formed with registering orifices 13' and 14' and beveled or rounded corners 19' to form the link chamber. The resilient link is under compressive force within the chamber in accordance with the inertia factor of the wiper-arm unit so that the stored-up energy within the resilient link will restore the link bar sections to their normal relationship in the transmission. This compressive force is applied herein by the body confining plates 16' and their tying rivets 17' which latter pass through the bar sections and play in slots 24 in one of them.

The foregoing description has been given in detail for clearness and ease of understanding and without thought of limitation, since the inventive principles involved are capable of assuming other physical embodiments within the spirit of the invention and the scope of the appended claims.

What is claimed is:

1. A windshield cleaner comprising a wiper, a rock shaft supporting the same for oscillation, a drive shaft, a power transmission operatively connecting the two shafts and including a rocker arm part fixed on each shaft and a reciprocatory link bar part joining the two rocker arms, one of said transmission parts having movably connected sections permitting inertia-actuated over-travel of the wiper, and a resilient member yieldably resisting relative movement between the sections in absorbing the force of inertia in the wiper, said sections of said one transmission part having a chamber means conformably confining the resilient member under compression.

2. A windshield cleaner comprising a wiper, a rock shaft supporting the same for oscillation, a motor driven shaft, a power transmission operatively connecting the two shafts and including a rocker arm part fixed on each shaft and a reciprocatory link bar part joining the two rocker arms, one of said transmission parts having movably connected sections with faces slidable one upon the other and formed with opposed chamber-forming recesses, and a rubber body conformably fitting the opposed recesses and deformable by and upon such relative sliding movement between the sections in yieldably resisting the same.

3. A windshield cleaner comprising a drive shaft, a driven shaft, a rocker arm on each shaft, a reciprocatory link bar joining said rocker arms, a wiper, an actuating arm for said wiper fixed to said driven shaft to be oscillated thereby, one of said rocker arms having relatively movable arm sections angularly displaceable about a common pivotal axis, one of said arm sections being fixed to its shaft to move with said wiper and said actuating arm together with said driven shaft as a unit in response to the force of inertia in said unit, and a resilient member interposed between the sections and yieldably resisting relative movement therebetween incidental to the inertia force at the moment of power reversal, said sections having a recess formation conformably confining said resilient member against free expansion.

4. A windshield cleaner comprising a wiper, a motor having a drive shaft and a wiper-carrying rockshaft, a rocker arm carried by each of said shafts, a connecting link tying said rocker arms together for unified movement of said shafts, at least one of said rocker arms comprising two sections pivotally connected to permit the turning of one section relative to the other, and resilient means flexibly connecting said sections together for a predetermined degree of relative movement in response to a predetermined force of inertia encountered at the end of a wiper stroke in either direction, whereby the ensuing countering turning force of motor torque and inertia build up within said multiple sectioned arm a sufficient potential energy to realine said arm sections for movement in unison to reestablish the normal relation between the wiper and the drive shaft.

5. A windshield cleaner comprising a wiper, a drive shaft, a wiper carrying rockshaft, a rocker arm fixed on each shaft, a connecting link tying said rocker arms together for unified movement of the said shafts, at least one of the said arms comprising two normally alined sections pivotally connected to permit the turning of one section relative to the other, and resilient means flexibly connecting the said sections together, said means being of sufficient strength to hold the sections normally alined for a predetermined normal speed of wiper operation and yieldable above such predetermined speed in the presence of the force of inertia in the wiper at the end of each stroke, while enabling an ensuing countering turning force of driving torque to jointly build up therewith in the resilient means sufficient potential energy to realine said arm sections for movement in unison to reestablish the normal relation between the wiper and the drive shaft.

6. A windshield cleaner comprising a wiping element, a motor having a drive shaft, a driven shaft supporting said wiping element for back and forth movement through a predetermined path, power transmission means connecting said driven shaft to said drive shaft and including two members normally moving as a unit but movable relative to each other in response to the inertia force in said wiping element at either end of said predetermined path, a force transmitting body of elastic material operatively interposed between the two relatively movable members normally to hold them yieldably in operative relationship, said relatively movable members forming a chamber completely and conformably enclosing the body, and means connecting said members for relative movement and tending to prevent the elastic material from being compressed.

7. A windshield cleaner comprising a wiper, a shaft supporting the same for oscillation, a rocker arm for actuating the shaft having a short section fixed thereto and a second section pivotally connected to the fixed section and extending radially outwardly from the shaft beyond the fixed section to form a composite rocker arm, means connected to the outer end of the second section for rocking the arm, and a force transmitting resilient member interposed between and yieldably holding the arm sections for rocking as a unit.

8. A windshield cleaner comprising a wiper, a drive shaft, a driven shaft supporting said wiper for back and forth movement through a predetermined path, one of said shafts having a lever arm, power transmission means extending between said driven shaft and said drive shaft and including a lever member provided with an orifice, and a resilient noncompressible member confined within the orifice defined by the walls of said orifice and said lever arm for normally holding the lever arm and said lever member for movement in unison throughout the greater part of each wiper stroke but permitting relative movement in response to the opposing forces of wiper inertia and driving torque during power reversal at the end of each wiper stroke to resist and gradually arrest the wiper movement, said resilient member being distortable by such relative movement to store up sufficient energy for restoring said one of said shafts and said lever member to their normal relation.

9. A windshield cleaner comprising a wiping element, a driven shaft supporting said wiping element for back and forth movement through a predetermined path, a drive shaft, power transmission means interconnecting said drive shaft and said driven shaft, said power transmission means including normally alined lever parts movable out of alinement to permit limited inertia-induced overtravel of said wiping element, resilient means energized by said inertia-induced overtravel to automatically realine said lever parts, and stop means operable upon predetermined movement of the lever parts out of alinement to provide a positive driving connection therebetween.

10. A windshield cleaner power transmission system comprising a power shaft, a wiper carrying rock shaft, power transmitting means connecting said rock shaft to said power shaft and including movably connected parts, and a rubber body confined in a recess in one of said parts and yieldably acting on the other of said parts to so bias them, said rubber body normally holding said parts biased into a predetermined relative position to drive said rock shaft in unison with said power shaft but yieldable to permit relative movement between said parts by the inertia force in the wiper during power reversal and thereby enable said rock shaft to have independent movement under the inertia force.

11. A windshield cleaner comprising a wiping element, a motor having a drive shaft, a driven shaft supporting said wiping element for back and forth movement through a predetermined path, power transmission means connecting said driven shaft to said drive shaft and including two members normally moving as a unit but movable relative to each other in response to the inertia force in said wiping element at either end of said predetermined path, a force transmitting body of non-compressible elastic material operatively interposed between the two relatively movable members normally to hold them yieldably in operative relationship, and a chamber completely and conformably enclosing the body, said elastic body being held in compression by the walls of the chamber.

12. A windshield cleaner comprising a wiper, a rock shaft supporting the same for oscillation, a motor driven shaft, a power transmission operatively connecting the two shafts and including a rocker arm part fixed on each shaft and a reciprocatory link bar part joining the two rocker arms, one of said transmission parts having movably connected sections with faces slidable one upon the other and formed with opposed chamber-forming recesses, and an elastic body of rubber or the like fitting within the formed chamber, the adjacent edges of the recesses being rounded for contact with the body upon relative movement between the transmission parts.

13. A windshield cleaner comprising a wiper, a drive shaft, a wiper carrying rockshaft, a rocker arm fixed on each shaft, a connecting link tying said rocker arms together for unified movement of the said shafts, at least one of the said arms comprising two normally alined sections pivotally connected to permit the turning of one section relative to the other, and resilient means flexibly connecting the said sections together, said means being of sufficient strength to hold the sections normally alined for a predetermined normal speed of wiper operation and yieldable above such predetermined speed in the presence of the force of inertia in the wiper at the end of each stroke.

References Cited in the file of this patent

UNITED STATES PATENTS

| | | |
|---|---|---|
| 603,694 | Kavanaugh | May 10, 1898 |
| 1,694,245 | Baker | Dec. 4, 1928 |
| 1,913,513 | Rossman | June 13, 1933 |
| 2,316,070 | Horton | Apr. 6, 1943 |
| 2,431,120 | Howe | Nov. 18, 1947 |
| 2,566,843 | Lappin | Mar. 22, 1950 |